US009695384B2

(12) United States Patent
Schweitzer et al.

(10) Patent No.: US 9,695,384 B2
(45) Date of Patent: Jul. 4, 2017

(54) PROCESS FOR PRODUCING A GLYCERIDE COMPOSITION

(75) Inventors: Erik Schweitzer, Wormerveer (NL); Sietze Bouwer, Wormerveer (NL); Krishnadath Bhaggan, Wormerveer (NL)

(73) Assignee: Loders Croklaan B.V., Wormerveer (NL)

( * ) Notice: Subject to any disclaimer, the term of this patent is extended or adjusted under 35 U.S.C. 154(b) by 1350 days.

(21) Appl. No.: 12/528,818

(22) PCT Filed: Feb. 27, 2008

(86) PCT No.: PCT/EP2008/001543
§ 371 (c)(1),
(2), (4) Date: Dec. 4, 2009

(87) PCT Pub. No.: WO2008/104381
PCT Pub. Date: Sep. 4, 2008

(65) Prior Publication Data
US 2010/0104694 A1    Apr. 29, 2010

(30) Foreign Application Priority Data
Feb. 28, 2007   (EP) .................................. 07250834

(51) Int. Cl.
| | | |
|---|---|---|
| A23D 9/007 | (2006.01) |
| C11C 3/10 | (2006.01) |
| A23D 9/02 | (2006.01) |
| A23L 33/00 | (2016.01) |
| A23L 33/115 | (2016.01) |
| A23L 33/12 | (2016.01) |
| A23D 7/00 | (2006.01) |

(52) U.S. Cl.
CPC .................. *C11C 3/10* (2013.01); *A23D 9/02* (2013.01); *A23L 33/115* (2016.08); *A23L 33/12* (2016.08); *A23L 33/40* (2016.08); *A23V 2002/00* (2013.01)

(58) Field of Classification Search
CPC ........................................................ C11C 3/00
USPC ............................................................ 426/33
See application file for complete search history.

(56) References Cited

U.S. PATENT DOCUMENTS

| | | | | |
|---|---|---|---|---|
| 4,360,536 | A * | 11/1982 | Keuning et al. ............... | 426/603 |
| 4,876,107 | A | 10/1989 | King et al. | |
| 5,013,569 | A | 5/1991 | Rubin | |
| 5,658,768 | A | 8/1997 | Quinlan | |
| 6,034,130 | A | 3/2000 | Wang et al. | |
| 6,090,598 | A | 7/2000 | Yamaguchi et al. .......... | 435/134 |
| 6,297,279 | B1 | 10/2001 | Wang et al. | |
| 2004/0126475 | A1 | 7/2004 | Hashizume et al. .......... | 426/601 |
| 2006/0105090 | A1 | 5/2006 | Cain et al. | |
| 2009/0130728 | A1 | 5/2009 | Schweitzer et al. | |

FOREIGN PATENT DOCUMENTS

| | | | |
|---|---|---|---|
| EP | 0209327 | 1/1987 | |
| EP | 0 417 823 A2 | 3/1991 | ............... C11C 3/00 |
| EP | 0496456 | 7/1992 | |
| EP | 0776357 | 6/1997 | |
| EP | 0698078 | 8/1997 | |
| EP | 0882797 | 12/1998 | |
| EP | 1038444 | 9/2000 | |
| EP | 1 477 070 A1 | 11/2004 | ............... A23D 9/00 |
| GB | 1577933 | 10/1980 | |
| GB | 2178752 | 2/1987 | |
| JP | H06-70186 A | 3/1994 | |
| WO | WO 94/10326 | 5/1994 | |
| WO | WO 96/19115 | 6/1996 | |
| WO | WO 2005/003365 | 1/2005 | |
| WO | WO 2005/036987 A1 | 4/2005 | ............... A23L 1/29 |
| WO | WO 2005/037373 | 4/2005 | |
| WO | WO 2006/114791 A1 | 11/2006 | ............... A23L 1/29 |
| WO | WO 2007/029018 | 3/2007 | |

OTHER PUBLICATIONS

SIEW, Palm Oil Products: Fatty Acid and Triglyceride Composition and Solid Fat Content, ELAEIS 5(1) Jun. 1993.*
Aini, Utilization of palm oil and palm products in shortenings and margarines, Eur. J. Lipid Sci. Technol. 109 (2007) 422-432.*
Ghazali H.M. et al., "Enzymatic Transesterification of Palm Olein with Nonspecific and 1,3-Specific Lipases", Journal of the American Oil Chemists' Society, 72(6):633-639 (Jun. 1, 1995).
European Search Report issued in European Patent Application No. EP 07 25 0834 (Jul. 12, 2007).
Chen et al., "Synthesis of the structured lipid 1,3-Dioleoyl-2-palmitoylglycerol from palm oil", Journal of the American Oil Chemists' Society, 81(6):525-532 (2004).
Filer et al., "Triglyceride Configuration and Fat Absorption by the Human Infant" J. Nutrition, 99(3):293-298 (1969).
Freeman et al., "Intramolecular fatty acid distribution in the milk fat triglycerides of several species" J. Dairy Sci., 48:853-858 (1965).
Goto et al., "Enzymatic interesterification of triglyceride with surfactant-coated lipase in organic media", Biotechnology and Bioengineering, 45(1):27-32 (1995).

(Continued)

*Primary Examiner* — D. Lawrence Tarazano
*Assistant Examiner* — Philip Dubois
(74) *Attorney, Agent, or Firm* — Morgan, Lewis & Bockius LLP

(57) ABSTRACT

A process for the production of a composition comprising 1,3-dioleoyl-2-palmitoyl glyceride (OPO) comprises: providing one or more palm oil stearin fractions comprising tripalmitoyl glyceride and having an iodine value between about 18 and about 40; interesterifying the one or more palm oil stearin fractions to form a randomly interesterified palm oil stearin; subjecting the randomly interesterified palm oil stearin to enzymic transesterification with oleic acid or a non-glyceride ester thereof using an enzyme having selectivity for the 1- and 3-positions of a glyceride; and separating palmitic acid or palmitic non-glyceride esters from the product obtained in (iii) to form a composition comprising OPO glyceride.

16 Claims, No Drawings

(56) References Cited

OTHER PUBLICATIONS

Nagao et al., "Use of thermostable *Fusarium heterosporum* lipase for production of structured lipid containing oleic and palmitic acids in organic solvent-free system", JAOCS, 78(2):167-172 (2001).
Nakaya et al., "Transesterification between triolein and stearic acid catalyzed by lipase in CO2 at various pressures", Biotechnology Techniques, 12(12):881-884 (1998).
Quinlan et al., "Modification of triglycerides by lipases: process technology and its application to the production of nutritionally improved fats", Inform., 4(5):580-585 (1993).
Schmid et al., "Highly selective synthesis of 1,3-oleoyl-2-palmitoylglycerol by lipase catalysis", Biotechnology and Bioengineering, 64(6):678-684 (1999).
Seriburi et al., "Enzymatic transesterification of Triolein and Stearic acid and solid fat content of their products", Journal of the American Oil Chemists' Society, 75(4):511-516 (1998).
English translation of Office Action issued in 2010 in related Chinese patent application 200680033013.2.
Deffense, "Fractionation of Palm Oil," Journal of the American Oil Chemists' Society, 62: 376-385 (1985).
Nesaretnam et al., "Application of Hydrogenated Palm Kernel Oil and Palm Stearin in Whipping Cream," Journal of the Science of Food and Agriculture, 61: 401-407 (1993).
Lai et al., "Physical Properties of Pseudomonas and Rhizomucor miehei Lipase-Catalyzed Transesterified Blends of Palm Stearin: Palm Kernel Olein," Journal of the American Oil Chemists' Society, 75: 953-959 (1998).
Traitler et al., "Palm Oil and Palm Kernel Oil in Food Products," Journal of the American Oil Chemists' Society, 62: 117-421 (1985).
Vander Wal, "Calculation of the Distribution of the Saturated and Unsaturated Acyl Groups in Fats, from Pancreatic Lipase Hydrolysis Data," Journal of the American Oil Chemists' Society, 37: 18-20 (1960).
GRAS exemption request for Betapol dated May 28, 2003.
Conversion between Palmitic acid content and Iodine value cited in Third Party Observations dated Feb. 17, 2017.
Third Party Observations submitted in corresponding European patent Application No. 08716077.6 dated Feb. 17, 2017.

\* cited by examiner

PROCESS FOR PRODUCING A GLYCERIDE COMPOSITION

This application is a 371 filing of PCT/EP2008/001543 (WO 2008/104381), filed Feb. 27, 2008, claiming priority benefit of European Patent Application No. 07250834.4, filed Feb. 28, 2007.

This invention relates to a process for producing a glyceride composition.

Triglyceride fats and oils are important commercial products and are used extensively in, for example, the food industry. Some triglycerides are nutritionally important and the triglyceride 1,3-dioleoyl-2-palmitoyl glyceride is known to be an important component of human milk fat.

Fat compositions containing the principal fatty acids found in human milk fat, in similar amounts to those found in human milk fat, may be derived from oils and fats of vegetable origin. However, a significant difference in composition arises because most glycerides of vegetable origin are unsaturated in the 2-position. In contrast, a substantial amount of palmitic acid occupies the 2-position of glycerides in human milk fat.

The difference in the distribution of acids along the glyceride positions is believed to have important dietary consequences. The distribution of fatty acids in the triglycerides of some milk fats of nutritional importance was studied by Freeman et al, (J. Dairy Sci., 1965, p. 853), who reported that human milk fat contains a greater proportion of palmitic acid in the 2-position, and a greater proportion of stearic acid and oleic acid in the 1,3-positions than the milk fat of ruminants. The greater absorption of palmitic acid in the 2-position of triglycerides by infants was reported by Filer et al (J. Nutrition, 99, pp. 293-298), who suggest that the relatively poor absorption of butter fat by infants compared with human milk fat is attributable to its substantially uniform distribution of palmitic acid between the glyceride positions of the fat.

In order to most closely match the chemical and/or physical properties of triglyceride fats or oils obtained from natural sources, to that of human milk fat, therefore, it is necessary to control the distribution of the fatty acid residues on the glyceride positions. Processes are thus known for selectively producing the triglyceride 1,3-dioleoyl-2-palmitoyl glyceride (OPO) for use in replacements for human milk fat.

EP-A-0209327 discloses milk replacement fat compositions comprising the triglyceride 1,3-dioleoyl-2-palmitoyl glyceride (OPO). The fat compositions can be obtained by subjecting fatty mixtures of 2-palmitoyl glycerides to reaction with oleic acid in the presence of a catalyst, such as a lipase, which is regiospecific in activity in the 1- and 3-positions of the glycerides. Enzymatic processes of this kind are also described in GB-A-1577933. Under the influence of the catalyst, unsaturated fatty acid residues may be introduced into the 1- and 3-positions of the 2-palmitoyl glycerides by exchange with unsaturated free fatty acids or their alkyl esters.

WO 2005/036987 discloses a process for producing a fat base by reacting a palmitic rich oil with unsaturated fatty acids such as oleic acid. The total palmitic acid residue content of the fat base is at most 38% and at least 60% of the fatty acid moieties are in the 2-position of the glyceride backbone. A related disclosure can be found in WO 2005/037373, filed on the same day.

WO 2006/114791 discloses human milk fat substitutes. The only palm oil stearins that are specifically mentioned have iodine values (IVs) of 34 and 15 and these are interesterified with triglyceride oils or chemically randomised before further use.

EP-A-1477070 and US 2004/126475 describe fat compositions comprising crystals of β form having a double chain length structure. The compositions are for use in baking.

EP-A-0417823 describes a process that involves the transesterification of triglycerides.

Commercial processes for producing triglycerides generally employ starting materials that are readily available at reasonable cost in large quantities. One suitable starting material that is relatively rich in triglycerides having palmitic acid in the 2-position is palm oil. Typically, palm oil is fractionated before being employed in this type of process.

Our copending international application no PCT/GB2006/003343 describes a process for the production of a composition comprising 1,3-dioleyl-2-palmitoyl glyceride (OPO) in which a palm oil stearin, with an iodine value (IV) between about 2 and about 12 to is subjected to enzymic transesterification, with oleic acid or a non-glyceride ester of oleic acid.

There remains a need to provide a more efficient process for the production of 1,3-dioleoyl-2-palmitoyl glyceride (OPO). For example, there is a need to increase the yield of the process and/or make the process more efficient.

According to the invention, there is provided a process for the production of a composition comprising 1,3-dioleyl-2-palmitoyl glyceride (OPO), wherein the process comprises:

(i) providing one or more palm oil stearin fractions comprising tripalmitoyl glyceride and having an iodine value between about 18 and about 40;

(ii) interesterifying the one or more palm oil stearin fractions to form a randomly interesterified palm oil stearin;

(iii) subjecting the randomly interesterified palm oil stearin to enzymic transesterification with oleic acid or a non-glyceride ester thereof using an enzyme having selectivity for the 1- and 3-positions of a glyceride; and (iv) separating palmitic acid or palmitic non-glyceride esters from the product obtained in (iii) to form a composition comprising OPO glyceride.

In another aspect, the invention provides the use of a randomly interesterified palm oil product (such as palm oil stearin) in a process for the production of a composition comprising 1,3-dioleyl-2-palmitoyl glyceride (OPO).

The invention allows the production of OPO glyceride in a more cost effective manner from commercially available starting materials. The invention is at least partly based on the finding that it is possible to increase the yield of the process by carrying out a step of interesterifying the one or more palm oil stearin fractions to form a randomly interesterified palm oil stearin prior to the 1-, 3-selective reaction with the oleic acid (or an oleoyl ester) in the presence of an enzyme. It has been found that this formation of a randomly interesterified palm oil stearin increases the amount of the 2-palmitoyl glyceride that is present in the final product and thus increases the yield of the process.

The process of the invention employs one or more palm oil stearin fractions in part (i). The palm oil stearin fractions may be a single palm oil stearin or a mixture of palm oil stearins, for example obtained in different fractionation processes and/or having different physical and/or chemical properties, such as different melting temperatures or different iodine values (Ns). Preferably, the one or more palm oil stearin fractions is or are bleached and deodorised before step (ii). Bleaching and deodorising can be carried out using techniques that are well known in the art.

The term "stearin", as used in this specification, includes a triglyceride mixture or fat blend from which at least 10% by weight of the lower melting constituents have been removed by some kind of fractionation, e.g., dry fractionation or solvent fractionation.

The optional bleaching of the palm oil stearin is typically performed above 95° C., more preferably above 100° C. (such as at from 105° C. to 120° C.). In the deodorising step, volatile impurities are removed from the palm oil stearin to yield deodorised palm oil stearin, typically at temperatures above 200° C. The impurities removed in the deodorising step commonly include free fatty acids, aldehydes, ketones, alcohols and other hydrocarbon impurities. The bleaching and deodorising may be carried out in a single process step or two or more process steps. For example, the steps may be carried out at reduced pressures (e.g., 10 mm Hg or below), wherein the palm oil stearin is contacted with steam to help vaporise the impurities. Bleaching and deodorising the palm oil stearin may help to improve the yield of the process.

Preferably, the one or more palm oil stearins is or are provided by fractionating palm oil or a derivative thereof. Although fractionation may be carried out with or without a solvent, it is preferred that the fractionation of the palm oil comprises dry fractionation. Thus, the process of fractionation is preferably carried out in the absence of a solvent.

The palm oil stearin preferably has an iodine value from about 18 to about 40, more preferably from about 18 to about 35. It will be appreciated that when a mixture of two or more palm oil stearins is employed, the iodine value refers to the iodine value of the mixture.

It has surprisingly been found, according to the invention, that it is possible to use as starting materials palm oil stearins having relatively high iodine values and yet still achieve high levels of C16:0 at the Sn-2 position in the composition comprising OPO i.e., after (iv).

The process of the invention may, in a preferred embodiment, use a palm oil stearin which comprises a mixture of at least two palm oil stearins having different iodine values. For example, the palm oil stearin may comprise a mixture of a first palm oil stearin having an iodine value of from about 10 to about 20 and a second palm oil stearin having an iodine value of from about 25 to 50. This permits the use of palm oil stearins having even higher iodine values in the process for making OPO.

Step (ii) in the process of the invention may be carried out using any method that effects random interesterification of the triglycerides in the one or more palm oil stearins. The random interesterification may be carried out chemically, for example using a base such as sodium ethoxide, but is preferably carried out enzymatically. The enzyme that is used is typically a lipase. The lipase will generally be substantially non-selective for the positions on the glyceride backbone, under the reaction conditions, in order to achieve the optimum random interesterification. Selective lipases may be used, provided that the reaction conditions are such that no significant selectivity is observed, for example by running the reaction for extended periods of time. Suitable lipases include the lipases from *Thermomyces lanuginosa, Rhizomucor miehei, Rhizopus delemar* and *Candida rugosa*. Preferably, the lipase is suitable for use with food products. It will be appreciated that the randomly interesterified palm oil stearin produced in (ii) is derived from the palm oil stearin only and not from other added triglycerides such as vegetable oils.

In step (ii), the palm oil triglycerides, which typically have more palmitic acid residues in the 1- and 3-positions than in the 2-position, are converted into glyceride compositions having a greater amount of palmitic acid at the 2-position of the glyceride. The interesterification may not be fully random but is preferably random to a large extent, for example greater than 75%, more preferably greater than 85%, such as greater than 95% of the fatty acid residues may change during the reaction i.e., less than 25%, more preferably less than 15%, such as less than 5% of the fatty acids retain their original position in the starting triglyceride. The percentages are based on the number of fatty acyl groups present. The degree of randomisation can be determined by measuring the Sn-2 value of the C16:0 fatty acids in the product. The Sn-2 value is the number of moles (or weight) of palmitoyl residues present at the 2-position of the glyceride divided by the total number of moles (or weight) of palmitoyl residues present in the glyceride. Thus, for example, pure OPO will have an Sn-2 value for C16:0 of 1 and pure POO will have an Sn-2 value of 0, whereas a fully randomised form of OPO (i.e., containing POO and OPO) will have an Sn-2 value of 0.33. Preferably, in the present invention, the randomisation in step (ii) is carried out to give an Sn-2 value for C16:0 of from 0.300 to 0.333, more preferably from 0.310 to 0.333, even more preferably from 0.315 to 0.333, such as 0.320 to 0.333 or 0.325 to 0.333.

Preferably in step (ii), the tripalmitoyl glyceride content (C48) decreases to about 60 to 20%, such as 60 to 40%, or 60 to 50% (e.g., 58 to 54%) and the dioleyl-monopalmitoyl glyceride content (C50) increases to about 28 to 40%, or 28 to 38% (e.g., 30 to 36%).

In step (iii) of the process, the randomly interesterified palm oil stearin is selectively transesterified with oleic acid or an oleoyl ester. This reaction preferentially replaces residues at the 1- and 3-positions of the glyceride relative to those at the 2-position. Thus, the product has greater amounts of the oleoyl residue at the 1- and 3-positions than at the 2-position. In the enzymic transesterification of step (iii), the fatty acids on the 2-position of the triglycerides typically do not change (for example, less than 40% by moles (or weight) of fatty acyl groups in the 2-position, more preferably less than 20%, such as less than 5% or less than 1%, change during the process). The conditions of the process are selected so as to provide the desired degree of selectivity from the enzyme. Preferred enzymes for use in step (iii) are lipases from *Rhizopus delemar* and *Rhizomucor miehei*. The transesterification reaction is typically performed to reach or approach equilibrium at a conversion ratio of a minimum of at least 50%, preferably at least 60%, most preferably at least 70%.

Preferably, in the transesterification reaction of step (iii), randomly interesterified palm oil stearin is mixed with an oleic acid concentrate (comprising free oleic acid at a concentration of greater than 65% by weight, preferably greater than 70% by weight, most preferably greater than 75% by weight). Alternatively, the oleic acid may be provided as a mixture comprising oleic acid (preferably in an amount of greater than 65% by weight), linoleic acid and, optionally, one or more other fatty acids. The ratio of the randomly interesterified palm oil stearin to oleic acid concentrate is preferably from 0.1:1 to 2:1, more preferably from 0.4:1 to 1.2:1, even more preferably from 0.4:1 to 1:1, most preferably from 1:1.1 to 1:2 on a weight basis. The reaction is preferably carried out at a temperature of from 30° C. to 90° C., preferably from 50° C. to 80° C., such as about 60° C. to 70° C., and may be conducted batchwise or in continuous fashion, with or without a water-immiscible organic solvent.

Before the enzyme transesterification reaction of step (iii), the humidity is preferably controlled to a water activity between 0.05 and 0.55, preferably between 0.1 and 0.5, depending on the type of biocatalyst enzyme system used. The reaction may be performed, for example, at 60° C. in a stirred tank or in a packed bed reactor over biocatalysts, based on concentrates of Lipase D (*Rhizopus oryzae*, previously classified as *Rhizopus delemar*, from Amano Enzyme Inc., Japan) or immobilised concentrates of *Rhizomucor miehei* (Lipozyme RM IM from Novozymes A/S, Denmark).

The non-glyceride esters of oleic acid that are optionally used in the invention, in addition to or as an alternative to, oleic acid, are preferably alkyl esters. The term "alkyl", as used herein, includes straight chain or branched saturated hydrocarbons having from 1 to 12, more preferably 1 to 6, carbon atoms.

In step (iv) of the process, palmitic acid or palmitic non-glyceride esters are separated from the desired OPO glyceride product. It will be appreciated that the separation is not usually complete and that both the materials separated and the product that remains will be mixtures. Also, the separation of the palmitic acid or palmitic non-glyceride esters will normally also separate other fatty acids or fatty acid non-glyceride esters from the product. The term "fatty acid", as used herein, refers to straight chain, saturated or unsaturated, carboxylic acids having from 12 to 24 carbon atoms.

In order to separate palmitic acid and other fatty acids or palmitic non-glyceride esters and other glycerides from OPO in step (iv), the transesterified mixture (optionally after further treatment, such as isolation of the fat phase) is preferably distilled. Distillation is preferably carried out at low pressure (e.g., lower than 10 mbar) and elevated temperatures (e.g., greater than 200° C.) to remove the fatty acids from the product triglyceride fraction.

The process of the invention may further comprise the step (v) of dry fractionating the product obtained in (iv) to form a fraction comprising an increased amount of OPO. However, this step may not be required depending on the purity of the final product and the desired end use of the product.

The composition or fraction produced according to the invention preferably comprises not more than 45 wt %, more preferably not more than 42 wt % of palmitic acid, based on total fatty acid content, and/or at least 53 wt %, more preferably at least 55 wt %, such as at least 58 wt %, of the palmitic acid residues are present in the 2-position of the glyceride.

A preferred composition or fraction of the invention preferably comprises not more than 42 wt % of palmitic acid, based on total fatty acid content, and at least 56 wt %, more preferably at least 58 wt %, of the palmitic acid residues are present in the 2-position of the glyceride.

Preferably, the tripalmitoylglyceride (PPP) content of the composition or fraction produced according to the invention is less than 9% (more preferably less than 8%) by weight of the composition.

Preferably, the composition of (iv) or the fraction of (v) is blended with at least one vegetable oil to form a fat composition for use as the fat in a human milk fat replacement product. Typically, the amount of vegetable oil varies from 1% to 75%, more preferably from 5 to 60%, such as from 10 to 50%, by weight of the fat blend. Examples of suitable vegetable oils include sunflower oil, high oleic sunflower oil, palm kernel oil, rapeseed oil and soybean oil and mixtures thereof. The resulting fat blends preferably have a Solid Content Index measured by NMR-pulse on non-stabilised fats within the following ranges: N0=35-55; N10=25-50 and N30</=10. These values were preferably obtained by melting the fat blend at 80° C., holding at 60° C. or higher for at least 10 minutes, cooling to 0° C. and holding at 0° C. for 16 hours, heating to the measurement temperature N and holding at that temperature for 30 minutes before measuring the N value.

Alternatively, the composition of (iv) or the fraction of (v) may be blended with a source of docosahexaenoic acid (DHA) or eicosapentaenoic acid (EPA), such as fish oil or a microbial oil, more preferably in a weight ratio of from 10:1 to 1:10.

The fat compositions or fat blends produced by the process of the invention may be suitable for replacing at least a part of the fat in infant food formulations. Infant food formulations may comprise the fat composition or fat blend of the invention together with one or more of protein, carbohydrate, minerals and vitamins. The present invention also therefore contemplates a method for the production of infant food compositions comprising fat, protein and carbohydrate components, for example in the approximate relative weight proportions 2.5:1:5, wherein at least a part of the fat normally used in such formulations is replaced by the fat composition or fat blend made in accordance with the present invention. Dry formulations containing this mixture, together with additional components customary in such formulations such as protein, carbohydrate, minerals and vitamins, may be dispersed for use in sufficient water to produce an emulsion of approximately 2 to 5 grams of fat per 100 ml of dispersion. Therefore, an infant food formulation may be prepared by packaging and labelling a composition comprising OPO triglyceride.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise.

EXAMPLES

Example 1

Randomisation of Palm Oil Stearin Fraction by Chemical Means

Chemical randomisation was carried out to have a reference for the enzyme-catalysed randomisation. 1 kg of palm oil stearin fraction with iodine value of 14 (POs14) was heated under vacuum to 110° C. for 15 minutes to remove all water. The vacuum was interrupted to add 0.15% sodium-ethanolate and the reaction was continued under vacuum during 30 minutes at 110° C. The reaction was stopped by washing the oil several times with demineralised water at 95° C.

Finally the fat was dried by vacuum. The analysis results are given below in Example 2.

Example 2

Randomisation of Palm Oil Stearin Fraction Enzymatically in Batch Reaction

The following three parameters apply to the randomisation of palm oil stearin fraction and to the manufacturing of a structured lipid comprising OPO (1,3-dioleyl-2-palmitoyl glyceride) in general.

Overall fatty acid composition: FAME
triglyceride carbon number: C48 tripalmitoyl glyceride,
C50 mono-oleyl-dipalmitoyl glyceride,
C52 dioleyl-monopalmitoyl glyceride,
C54 trioleyl glyceride
relative position of palmitic acid: Sn-2 C16:0.

Sn-2 is as defined above and refers to the number of moles (or weight) of palmitoyl residues present at the 2-position of the glyceride divided by the total number of moles (or weight) of palmitoyl residues present in the glyceride.

POs14 (palm oil stearin fraction with iodine value of 14) was randomised in batch reaction using immobilised lipase TL-IM (*Thermomyces lanuginosus*, Novozymes) as catalyst.

170 g POs14 was melted in a 250 ml roundbottom flask at 70° C. under nitrogen. 0.5% g/g or 0.85 g enzyme was added and the flask was closed. The reaction time was six days, while stirring with a magnetic stirrer. At intervals samples were taken for analysis.

There is a prominent decrease in the tripalmitin concentration (C48) and increase in the mono-olein-dipalmitin concentration (C50).

The results of the analyses are listed in Table 1. It appears that enzymatic randomisation indeed increases the Sn-2 C16:0 value to about the maximal random value of 0.33.

The tripalmitoyl glyceride content (C48) decreases from 62% to 56% and the dioleyl-monopalmitoyl glyceride content (C50) increases from 24.5% to 33-34%.

Comparison with the analyses obtained from the chemical randomisation shows that the enzymatic reaction was almost complete.

TABLE 1

Randomisation of POs14 with lipase TL-IM, analysis data

|  | regular POs14 | randomised Pos14 chemical | randomised Pos14 enzymatic |
| --- | --- | --- | --- |
| C14:0 | 1.2 | 1.2 | — |
| C16:0 | 80.3 | 79.8 | — |
| C18:0 | 5.2 | 5.4 | — |
| C18:1 | 10.4 | 10.6 | — |
| C18:2 | 2.1 | 2.3 | — |
| C46 (PPM) | 3 | 2.8 | 3.2 |
| C48 (PPP) | 62.3 | 55.8 | 55.8 |
| C50 (PPO&POP) | 24.5 | 33.4 | 33.6 |
| C52 (OPO&OOP) | 8.5 | 6.7 | 6.8 |
| C54 (OOO) | 1.7 | 0.6 | 0.8 |

Example 3

Manufacture of Structural Lipid Containing 1,3-Dioleyl-2-Palmitoyl Glyceride (OPO) with Regular and with Randomised Palm Oil Stearin Fraction (POs14)

The structural lipid comprising OPO was manufactured by enzymatic 1,3-specific acidolysis between oleic fatty acid and POs14. A continuous packed bed reactor containing enzyme was used. This enzyme was lipase D (*Rhizopus delemar*, Amano) immobilised on microporous polypropylene beads (Accurel).

The source oil consisted of a mixture of POs14 and oleic fatty acid with ratio 1:1.4 g/g. The mixture was pumped slowly through a column containing the immobilised enzyme. During the passage of the oil/fatty acid mixture, the acidolysis reaction takes place, whereby the conversion level is proportional to the residence time in the column. The residence time is the void volume in the enzyme bed divided by the flow rate. The residence time used in this example was 53 minutes.

Water was added in order to keep the enzyme active. The water content in the POs14/oleic acid mixture was maintained at 0.15% g/g. The reaction temperature was 60° C. The duration of each experiment was three days.

The product emerging from the column was at intervals analysed for its Sn-2 value and glyceride content by carbon number.

In Table 2, the average results of four experiments, two with regular and two with randomised POs14, are listed. The composition of each POs14 source is included in columns 2 and 4.

From these data the following can be deduced.
1. The difference between the regular and randomized POs14, which were from another randomisation reaction is essentially the same as shown in Example 2.
2. The large difference in C-number composition between both POs14 sources does not have much effect on the corresponding C-number composition of the resulting fats, which are surprisingly alike.
3. There is a significant increase of the Sn-2 value in the fat originating from the randomised POs14.

TABLE 2

Average analysis of fat product from regular POs14 and from random POs14 (2 × 2 experiments)

|  | regular POs14 | structured fat product | randomized POs14 | structured fat product |
| --- | --- | --- | --- | --- |
| C48 | 60.5 | 8.8 | 53.7 | 8.6 |
| C50 | 24.3 | 34.3 | 32.5 | 34.7 |
| C52 | 8.8 | 43.5 | 7.2 | 44.6 |
| C54 | 2.4 | 11.6 | 3.0 | 10.4 |
| Sn-2 | 0.297 | 0.555 ± 0.005 | 0.319 | 0.584 ± 0.002 |

Example 4

Enzymatically Randomized POsIV35 (ER(POsIV35)) as Feedstock

About 9.0 kg of POsIV35 was enzymatically randomized by stirring the oil at 70° C. for 48 hours in the presence of 3% (wt) lipase Lipozyme TL IM (*Thermomyces lanuginosa*, Novozymes). After this, the enzyme was filtered off and the oil was physically refined. Physically refining includes bleaching the randomized oil with 0.5% (wt) bleaching earth at 90° C. and deodorizing after filtration at 215° C. for 3 hours. A sample of the refined oil was submitted for analysis. The results are shown in Table 3.

The randomized POsIV35 was interesterified with oleic acid in a continuous process. This reaction was performed at 60° C. and catalyzed by Lipase D (from *Rhizopus delemar*). After the acidolysis reaction, the excess of fatty acids was removed by mean of short path distillation. A sample was submitted for analysis. The results are shown in Table 3.

Example 5

POsIV35 as Feedstock

POsIV35 was directly interesterified with oleic acid in a continuous process. This reaction was performed at 60° C. and catalyzed by Lipase D (from *Rhizopus delemar*). After the acidolysis reaction, the excess of fatty acids was removed by mean of short path distillation. A sample was submitted for analysis. The results are shown in Table 3.

TABLE 3

Analysis of samples removed during the production of Fat base from ER(POsIV35) and POsIV35

|  | POsIV35 | Refined ER(POsIV35) | Fat base ER(POsIV35) | Fat base POsIV35 |
|---|---|---|---|---|
| sn-2 C16 | 19.3 | 34 | 56.5 | 37.2 |
| Carbon numbers | | | | |
| C46 | 2 | 1.9 | 0.7 | 0.1 |
| C48 | 24.7 | 24.1 | 4.8 | 4.9 |
| C50 | 41.9 | 41.8 | 24.4 | 21.3 |
| C52 | 25.2 | 25.8 | 46.4 | 42.2 |
| C54 | 5.9 | 6.2 | 22.9 | 30.6 |
| C56 | 0.3 | 0.3 | 0.8 | 0.9 |
| Fatty acid composition | | | | |
| C12:0 | 0.14 | 0.19 | 0.21 | 0.17 |
| C15:0 | 0.1 | 0.1 | 0 | 0 |
| C14:0 | 1.2 | 1.3 | 0.7 | 0.6 |
| C16:0 | 58.3 | 57.2 | 31.6 | 29.4 |
| C18:0 | 4.7 | 4.9 | 3.8 | 3.1 |
| C18:1T | 0.1 | 0 | 0.1 | 0.2 |
| C18:1C | 28.1 | 28.8 | 56.6 | 58.5 |
| C18:2T | 0.2 | 0.2 | 0.2 | 0.2 |
| C18:2C | 6.2 | 6.4 | 5.5 | 6.6 |
| Total Trans | 0.3 | 0.2 | 0.4 | 0.4 |
| C20:0 | 0.4 | 0.4 | 0.3 | 0.3 |
| C20:1C | 0.1 | 0.1 | 0.2 | 0.2 |
| C22:0 | 0.1 | 0.1 | 0.3 | 0.3 |
| C24:0 | 0.1 | 0 | 0.1 | 0.1 |
| SAFA | 65.1 | 64.2 | 37.1 | 34 |
| MUFA | 28.4 | 29.1 | 57 | 59 |
| PUFA | 6.5 | 6.7 | 5.9 | 7 |

Example 6

Randomisation of Palm Oil Stearine Fraction POs20 in an Enzyme Packed Bed Reactor Palm oil stearine fraction POs20—having an iodine value IV of 20—was made by mixing POs14 and POs35 in a 2:1 ratio. This mixture was pumped in plug-flow mode through a packed bed reactor containing immobilized lipase TL-IM (*Thermomyces lanuginosus*, Novozymes). The pump rate was about 2 bedmasses of oil per hour, at a temperature of 70° C. At various intervals samples were collected to determine the glyceride composition with carbon number analysis and the relative amount of palmitic acid on the 2-position of the glycerol, Sn-2 C16:0.

The analyses of regular and randomized POs20 are shown in Table 4, columns 2 and 4. The Sn-2 C16:0 increases from 0.267 to 0.316.

Example 7

Manufacture of Structural Lipid Containing 1,3-Dioleyl-2-Palmitoyl Glyceride (OPO) with Regular and with Randomised Palm Oil Stearine Fraction POsIV20

The structural lipid comprising OPO was manufactured by enzymatic 1,3-specific acidolysis between oleic fatty acid and regular or randomized POs20. As in Example 4, a continuous packed bed reactor containing immobilized lipase D (*Rhizopus delemar*, Amano) was used, and the ratio of POs20 and oleic acid was 1:1.4 g/g, alike with regular or randomized POs20

At various intervals samples were collected to determine the glyceride composition with carbon number analysis and the relative amount of palmitic acid on the 2-position of the glycerol, Sn-2 C16:0.

In Table 4, the average results of two experiments, one with regular and one with randomised POs20, are listed. The composition of each POs20 source and the resulting structured fat product are given.

TABLE 4

Analysis of non-randomized POs20 and of randomized POs20, and of the structured fat products thereof

|  | POs20 non-randomized | structured fat product | POs20 randomized | structured fat product |
|---|---|---|---|---|
| C48 | 50.0 | 7.7 | 43.6 | 7.1 |
| C50 | 29.2 | 31.4 | 39.0 | 32.2 |
| C52 | 14.0 | 43.1 | 12.4 | 45.9 |
| C54 | 3.4 | 16.5 | 1.6 | 13.5 |
| Sn-2 C16:0 | 0.267 | 0.489 | 0.316 | 0.551 |

The invention claimed is:

1. A process for the production of a composition comprising 1,3-dioleoyl-2-palmitoyl glyceride (OPO), wherein the process comprises:
    providing one or more palm oil stearin fractions comprising tripalmitoyl glyceride and having an iodine value between about 18 and about 40;
    (ii) interesterifying the one or more palm oil stearin fractions to form a randomly interesterified palm oil stearin having a SN-2 value for C16:0 of from 0.300 to 0.333;
    (iii) subjecting the randomly interesterified palm oil stearin to enzymic transesterification with oleic acid or a non-glyceride ester thereof using an enzyme having selectivity for the 1- and 3-positions of a glyceride; and
    (iv) separating palmitic acid or palmitic non-glyceride esters from the product obtained in (iii) to form a composition comprising OPO glyceride,
    wherein the composition comprises not more than 45 wt % of palmitic acid, based on total fatty acid content, and wherein at least 53 wt % of the palmitic acid residues are present in the 2-position of the glyceride.

2. A process according to claim 1, wherein the one or more palm oil stearin fractions is or are bleached and deodorised before step (ii).

3. A process according to claim 1 or claim 2, further comprising the step (v) of dry fractionating the product obtained in (iv) to form a fraction comprising an increased amount of OPO.

4. A process according to claim 1, wherein step (ii) is carried out enzymatically.

5. A process according to claim 1, wherein the one or more palm oil stearins is or are provided by fractionating palm oil or a derivative thereof.

6. A process according to claim 5, wherein fractionating palm oil comprises dry fractionation.

7. A process according to claim 1, wherein the palm oil stearin has an iodine value between about 18 and about 35.

8. A process according to claim 1, wherein the palm oil stearin comprises a mixture of at least two palm oil stearins having different iodine values.

9. A process according to claim 1, wherein the palm oil stearin comprises a mixture of a first palm oil stearin having an iodine value of from about 10 to about 20 and a second palm oil stearin having an iodine value of from about 25 to 50.

10. A process according to claim 1, further comprising the step of blending the composition of (iv) or the fraction of (v) with at least one vegetable oil.

11. A process according to claim 10, wherein the vegetable oil is selected from sunflower oil, high oleic sunflower oil, palm kernel oil, rapeseed oil and soybean oil, and mixtures thereof.

12. A process according to claim 1, further comprising the step of blending the composition of (iv) or the fraction of (v) with a source of docosahexaenoic acid (DHA) or eicosapentaenoic acid (EPA).

13. A process according to claim 1, wherein at least 55 wt % of the palmitic acid residues are present in the 2-position of the glyceride.

14. A process according to claim 1, wherein the composition or fraction comprises not more than 42 wt % of palmitic acid, based on total fatty acid content, and wherein at least 56 wt % of the palmitic acid residues are present in the 2-position of the glyceride.

15. A process according to claim 14, wherein at least 58 wt % of the palmitic acid residues are present in the 2-position of the glyceride.

16. A process according to claim 1, wherein the tripalmitoylglyceride (PPP) content of the composition or fraction is less than 9% by weight of the composition.

\* \* \* \* \*